(12) United States Patent
Sherman et al.

(10) Patent No.: US 9,296,933 B2
(45) Date of Patent: *Mar. 29, 2016

(54) URETHANE-BASED PRESSURE SENSITIVE ADHESIVES

(75) Inventors: Audrey A. Sherman, St. Paul, MN (US); Scott M. Tapio, Falcon Heights, MN (US); James P. DiZio, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 761 days.

This patent is subject to a terminal disclaimer.

(21) Appl. No.: 13/320,399

(22) PCT Filed: Apr. 20, 2010

(86) PCT No.: PCT/US2010/031689
§ 371 (c)(1),
(2), (4) Date: Jan. 12, 2012

(87) PCT Pub. No.: WO2010/132176
PCT Pub. Date: Nov. 18, 2010

(65) Prior Publication Data
US 2012/0100326 A1    Apr. 26, 2012

Related U.S. Application Data

(60) Provisional application No. 61/178,514, filed on May 15, 2009.

(51) Int. Cl.
*C09J 7/02* (2006.01)
*C08G 71/02* (2006.01)
*C08G 71/04* (2006.01)
*C09J 175/16* (2006.01)

(52) U.S. Cl.
CPC .............. *C09J 175/16* (2013.01); *C08G 71/02* (2013.01); *C08G 71/04* (2013.01); *C09J 7/0246* (2013.01); *C08G 2170/40* (2013.01); *C09J 2203/322* (2013.01); *C09J 2475/00* (2013.01); *Y10T 428/1476* (2015.01); *Y10T 428/2887* (2015.01)

(58) Field of Classification Search
CPC .. C09J 7/0246; C09J 175/16; C09J 2203/322; C09J 2475/00; C08G 71/02; C08G 71/04; C08G 2170/40; Y10T 428/1476; Y10T 428/2887
USPC ........................................................ 524/198
See application file for complete search history.

(56) References Cited

U.S. PATENT DOCUMENTS

| | | |
|---|---|---|
| RE24,906 E | 12/1960 | Ulrich |
| 4,554,324 A | 11/1985 | Husman |
| 4,737,559 A | 4/1988 | Kellen |
| 5,223,465 A | 6/1993 | Ueki |
| RE34,605 E | 5/1994 | Schrenk |
| 5,360,659 A | 11/1994 | Arends |
| 5,407,971 A | 4/1995 | Everaerts |
| 5,506,279 A | 4/1996 | Babu |
| 5,579,162 A | 11/1996 | Bjornard |
| 5,686,544 A | 11/1997 | Pocius |
| 5,882,774 A | 3/1999 | Jonza |
| 6,049,419 A | 4/2000 | Wheatley |
| 6,063,890 A | 5/2000 | Tye |
| 6,083,856 A | 7/2000 | Joseph |
| 6,207,727 B1 | 3/2001 | Beck |
| 6,369,123 B1 | 4/2002 | Stark |
| 6,448,339 B1 | 9/2002 | Tomita |
| 6,492,028 B2 | 12/2002 | Kotera |
| 6,518,359 B1 | 2/2003 | Clemens |
| 6,642,304 B1 | 11/2003 | Hansen |
| 6,664,359 B1 | 12/2003 | Kangas |
| 6,720,387 B1 | 4/2004 | Stark |
| 6,800,680 B2 | 10/2004 | Stark |
| 6,824,820 B1 | 11/2004 | Kinning |
| 7,071,263 B2 | 7/2006 | Cheng |
| 2003/0108738 A1 * | 6/2003 | Alahapperuma et al. ...... 428/343 |
| 2004/0202879 A1 | 10/2004 | Xia |
| 2005/0239916 A1 | 10/2005 | Day |
| 2006/0292378 A1 * | 12/2006 | Mgaya et al. .............. 428/423.1 |
| 2007/0160811 A1 | 7/2007 | Gaides |
| 2007/0179254 A1 | 8/2007 | Wang |
| 2008/0121341 A1 | 5/2008 | Landoll |
| 2011/0039099 A1 | 2/2011 | Sherman |
| 2013/0098543 A1 * | 4/2013 | Reuter et al. ................... 156/247 |

(Continued)

FOREIGN PATENT DOCUMENTS

CN    1192756    9/1998
EP    0539099    4/1993

(Continued)

OTHER PUBLICATIONS

Properties of Bomar Specialties Co. BR-300 Series Oligomer Products, 2011.*
Extended European Search Report for Application No. 08868240.6, dated Jan. 20, 2012, 6 pages.
International Search Report for International Application No. PCT/US2008/086596, 4 pages.
Written Opinion of International Application No. PCT/US2008/086596, 4 pages.
International Search Report for PCT/US2010/031689, Mailing Date Oct. 27, 2010, 3 pages.
U.S. Appl. No. 61/417,582, filed Nov. 20, 2010, entitled Method of Applying Optical Film to Large Formal Disiplay Panel.

*Primary Examiner* — Angela C Scott
(74) *Attorney, Agent, or Firm* — Jeffrey M. Olofson

(57) ABSTRACT

Non-silicone, urethane-based adhesives are disclosed which are prepared by the polymerization of reactive oligomers with the general formula X-A-B-A-X, where X is an ethylenically unsaturated group B is a unit free of silicone, and A is a urethane linkage. The adhesives are optically clear, self wetting and removable. Adhesive articles, including optical adhesive articles, may be prepared using the disclosed non-silicone urethane-based adhesives.

7 Claims, No Drawings

(56) References Cited

U.S. PATENT DOCUMENTS

2013/0255874 A1* 10/2013 Tapio et al. .................. 156/249
2013/0337260 A1* 12/2013 Tapio et al. ............. 428/355 AC

FOREIGN PATENT DOCUMENTS

| | | |
|---|---|---|
| GB | 1556797 | 11/1979 |
| WO | WO 94-20583 | 9/1994 |
| WO | WO 99-42536 | 8/1999 |
| WO | WO 00-24839 | 5/2000 |
| WO | WO 02-06413 | 1/2002 |
| WO | WO 2004-094549 | 11/2004 |
| WO | WO 2005-019369 | 3/2005 |
| WO | WO 2005-044470 | 5/2005 |
| WO | WO 2005-044897 | 5/2005 |
| WO | WO 2007-030584 | 3/2007 |
| WO | WO 2009-049008 | 4/2009 |
| WO | WO 2009-050787 | 4/2009 |
| WO | WO 2009-085662 | 7/2009 |
| WO | WO 2009-105297 | 8/2009 |
| WO | WO 2010-132176 | 11/2010 |

* cited by examiner

URETHANE-BASED PRESSURE SENSITIVE ADHESIVES

CROSS REFERENCE TO RELATED APPLICATIONS

This application is a national stage filing under 35 U.S.C. 371 of PCT/US2010/031689, filed Apr. 20, 2010, which claims priority to U.S. Provisional Application No. 61/178,514, filed May 15, 2009, the disclosure of which is incorporated by reference in its/their entirety herein.

FIELD OF THE DISCLOSURE

The present disclosure relates generally to the field of adhesives, specifically to the field of pressure sensitive adhesives that are non-silicone and urethane-based.

BACKGROUND

Adhesives have been used for a variety of marking, holding, protecting, sealing and masking purposes. Adhesive tapes generally comprise a backing, or substrate, and an adhesive. One type of adhesive, a pressure sensitive adhesive, is particularly useful for many applications.

Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

SUMMARY

The need remains for adhesives with a range of different properties. Disclosed herein are urethane-based adhesives comprising a cured mixture comprising at least one reactive oligomer with the general formula X-A-B-A-X, wherein X comprises an ethylenically unsaturated group, B comprises a non-silicone unit with a number average molecular weight of 5,000 grams/mole or greater, and A comprises a urethane linking group, wherein the adhesive is optically clear, self wetting and removable.

Also disclosed are curable reaction mixtures comprising at least one X-A-B-A-X reactive oligomer, wherein X comprises an ethylenically unsaturated group, B comprises a non-silicone unit with a number average molecular weight of 5,000 grams/mole or greater, and A comprise a urethane linking group, and an initiator. In some embodiments, the curable reaction mixture further comprises additional ethylenically unsaturated material.

Additionally, methods of preparing adhesives are disclosed, comprising providing a curable composition comprising at least one X-A-B-A-X reactive oligomer, wherein X comprises an ethylenically unsaturated group, B comprises a non-silicone unit with a number average molecular weight of 5,000 grams/mole or greater, and A comprises a urethane linkage, and an initiator, and curing the curable composition.

Adhesive articles are disclosed comprising a pressure sensitive adhesive comprising the cured reaction product of at least one X-A-B-A-X reactive oligomer, wherein X comprises an ethylenically unsaturated group, B comprises a non-silicone unit with a number average molecular weight of 5,000 grams/mole or greater, and A comprises a urethane linking group, wherein the adhesive is optically clear, self wetting and removable, and a substrate. A wide range of substrates are suitable for preparing adhesive articles.

DETAILED DESCRIPTION

The use of adhesives, especially pressure sensitive adhesives, in areas such as the medical, electronic and optical industries is increasing. The requirements of these industries place additional demands upon the pressure sensitive adhesive beyond the traditional properties of tack, peel adhesion and shear strength. New classes of materials are desirable to meet the increasingly demanding performance requirements for pressure sensitive adhesives.

A class of non-silicone urethane-based adhesives, specifically pressure sensitive adhesives, are disclosed. These urethane-based adhesives are prepared from curable non-silicone, urethane-based reactive oligomers. The reactive oligomers contain free radically polymerizable groups. In some embodiments the non-silicone urethane-based adhesives contain polyoxyalkylene (polyether) groups.

The non-silicone urethane-based adhesives, especially non-silicone, urethane-based pressure sensitive adhesives, prepared by the free radical polymerization of non-silicone containing urethane-based reactive oligomers, have a variety of silicone-like properties. Among these properties are optical clarity, self wetting and removability.

The term "adhesive" as used herein refers to polymeric compositions useful to adhere together two adherends. Examples of adhesives are heat activated adhesives and pressure sensitive adhesives.

Heat activated adhesives are non-tacky at room temperature but become tacky and capable of bonding to a substrate at elevated temperatures. These adhesives usually have a Tg (glass transition temperature) or melting point (Tm) above room temperature. When the temperature is elevated above the Tg or Tm, the storage modulus usually decreases and the adhesive becomes tacky. Typically glass transition temperature (Tg) is measured using Differentially Scanning calorimetry (DSC).

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend.

Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "non-silicone" as used herein refers to repeat units, to segmented copolymers or units of segmented copolymers that are free of silicone units. The terms silicone or siloxane are used interchangeably and refer to units with dialkyl or diaryl siloxane ($-SiR_2O-$) repeating units.

The term "urethane-based" as used herein refers to macromolecules that are copolymers or segmented copolymers which contain at least one urethane linkage. The urethane group has the general structure (—O—(CO)—NR—) where (CO) defines a carbonyl group C=O, and R is hydrogen or an alkyl group.

The term "segmented copolymer" refers to a copolymer of linked segments, each segment constitutes primarily a single structural unit or type of repeating unit. For example, a polyoxyalkylene segmented copolymer may have the following structure:

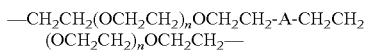
—CH$_2$CH$_2$(OCH$_2$CH$_2$)$_n$OCH$_2$CH$_2$-A-CH$_2$CH$_2$ (OCH$_2$CH$_2$)$_n$OCH$_2$CH$_2$— where A is the linkage between the 2 polyoxyalkylene segments, or it may have the following structure:

—CH$_2$CH$_2$(OCH$_2$CH$_2$)$_n$OCH$_2$CH$_2$-A-B— where A is the linkage between the polyoxyalkylene segment and the B segment.

The term "reactive oligomer" as used herein refers to a macromolecule which contains terminal free radically polymerizable groups. "Urethane-based reactive oligomers" are macromolecules which contain terminal free radical polymerizable groups and at least one urethane linkage.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example,

—CH$_2$CH$_2$(OCH$_2$CH$_2$)$_n$OCH$_2$CH$_2$—.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —R$^a$-Ar$^a$- where R$^a$ is an alkylene and Ar$^a$ is an arylene (i.e., an alkylene is bonded to an arylene).

The term "(meth)acrylate" refers to monomeric acrylic or methacrylic esters of alcohols. Acrylate and methacrylate monomers are referred to collectively herein as "(meth)acrylate" monomers.

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, "optically clear" refers to an adhesive or article that has a high light transmittance over at least a portion of the visible light spectrum (about 400 to about 700 nm), and that exhibits low haze.

Unless otherwise indicated, "self wetting" refers to an adhesive which is very soft and conformable and is able to be applied with very low lamination pressure. Such adhesives exhibit spontaneous wet out to surfaces.

Unless otherwise indicated, "removable" refers to an adhesive that has relatively low initial adhesion (permitting temporary removability from and repositionability on a substrate after application), with a building of adhesion over time (to form a sufficiently strong bond), but remains "removable" i.e. the adhesion does not build beyond the point where it is permanently cleanly removable from the substrate.

Urethane-based adhesives are prepared from curable non-silicone urethane-based reactive oligomers. The reactive oligomers contain free radically polymerizable groups. The non-silicone urethane-based reactive oligomers of this disclosure have the general structure X-A-B-A-X. In this structure the B unit is a non-silicone group with a number average molecular weight of 5,000 grams/mole or greater, the A groups are urethane linkages, and the X groups are ethylenically unsaturated groups.

The reactive oligomers described by the formula X-A-B-A-X may be a mixture of reactive oligomers. The mixture of reactive oligomers may include reactive oligomers which have a functionality of less than 2. These oligomers can be described by the general structure X-A-B—Y where X, A, and B are as previously described and Y is a group that is not free radically polymerizable and may or may not contain a urethane linkage to the B unit. An example of a Y group is a hydroxyl (—OH) group which could be the unreacted remnant from a HO—B—OH precursor. The presence of X-A-B—Y components along with the X-A-B-A-X components can give a branched polymer when the mixture is polymerized because the unreactive Y groups do not become part of polymer backbone.

This branching, due to the use of monomers that are not completely difunctional, is a common feature in many polyurethane adhesives because until recently, purely difunctional diols of high molecular weight were not available. In the adhesives of the present disclosure, this branching, when present, does not produce undesirable properties, but rather may even be desirable. For example, branching may assist in producing adhesives which have the desirable silicone-like properties such as self wetting.

The X-A-B-A-X reactive oligomers may be prepared, for example, by the reaction of a hydroxyl-functional precursor of general formula HO—B—OH with 2 equivalents of an isocyanate-functional precursor of the general formula Z—X, where the Z group is isocyanate-functional and the X groups are ethylenically unsaturated groups. The isocyanate functionality of the Z group reacts with a hydroxyl group of the polyol to form the urethane linkage.

A wide variety of HO—B—OH precursors may be used. The HO—B—OH may be polyol or it may be a hydroxyl-capped prepolymer such as a polyurethane, polyester, polyamide, or polyurea prepolymer.

Examples of useful polyols include, but are not limited to, polyester polyols (e.g., lactone polyols) and the alkylene oxide (e.g., ethylene oxide; 1,2-epoxypropane; 1,2-epoxybutane; 2,3-epoxybutane; isobutylene oxide; and epichlorohydrin) adducts thereof, polyether polyols (e.g., polyoxyalkylene polyols, such as polypropylene oxide polyols, polyethylene oxide polyols, polypropylene oxide polyethylene oxide copolymer polyols, and polyoxytetramethylene polyols; polyoxycycloalkylene polyols; polythioethers; and alkylene oxide adducts thereof), polyalkylene polyols, mixtures thereof, and copolymers therefrom. Polyoxyalkylene polyols are particularly useful.

When copolymers are used, chemically similar repeating units may be randomly distributed throughout the copolymer or in the form of blocks in the copolymer. Similarly, chemically similar repeating units may be arranged in any suitable order within the copolymer. For example, oxyalkylene repeating units may be internal or terminal units within a copolymer. The oxyalkylene repeating units may be randomly distributed or in the form of blocks within a copolymer. One example of a copolymer containing oxyalkylene repeating units is a polyoxyalkylene-capped polyoxyalkylene polyol (e.g., a polyoxyethylene-capped polyoxypropylene).

When higher molecular weight polyols (i.e., polyols having weight average molecular weights of at least about 2,000) are used, it is often desirable that the polyol component be "highly pure" (i.e., the polyol approaches its theoretical functionality—e.g., 2.0 for diols, 3.0 for triols, etc.). These highly pure polyols generally have a ratio of polyol molecular weight to weight % monol of at least about 800, typically at least about 1,000, and more typically at least about 1,500. For example, a 12,000 molecular weight polyol with 8 weight % monol has such a ratio of 1,500 (i.e., 12,000/8=1,500). Generally it is desirable that the highly pure polyol contains about 8% by weight monol or less.

Generally, as the molecular weight of the polyol increases in this embodiment, a higher proportion of monol may be present in the polyol. For example, polyols having molecular weights of about 3,000 or less desirably contain less than about 1% by weight of monols. Polyols having molecular weights of greater than about 3,000 to about 4,000 desirably contain less than about 3% by weight of monols. Polyols having molecular weights of greater than about 4,000 to about 8,000 desirerably contain less than about 6% by weight of monols. Polyols having molecular weights of greater than about 8,000 to about 12,000 desirably contain less than about 8% by weight of monols.

Examples of highly pure polyols include those available from Lyondell Chemical Company of Houston, Tex., under the trade designation, ACCLAIM, and certain of those under the trade designation, ARCOL.

Where HO—B—OH is a hydroxyl-capped prepolymer, a wide variety of precursor molecules can be used to produce the desired HO—B—OH prepolymer. For example, the reaction of polyols with less than stoichiometric amounts of diisocyanates can produce a hydroxyl-capped polyurethane prepolymer. Examples of suitable diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylene-diphenylene-4,4'-diisocyanate, polycarbodiimide-modified methylenediphenylene diisocyanate, (4,4'-diisocyanato-3,3', 5,5'-tetraethyl) biphenylmethane, 4,4'-diisocyanato-3,3'-dimethoxybiphenyl, 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5diisocyanatopentane, and cycloaliphatic diisocyanates such as methylene-dicyclohexylene-4,4'-diisocyanate, and 3-isocyanatomethyl-3,5,5-trimethyl-cyclohexyl isocyanate (isophorone diisocyanate).

An example of the synthesis of a HO—B—OH prepolymer is shown in Reaction Scheme 1 (where (CO) represents a carbonyl group C=O) below:

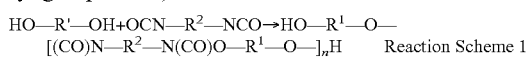
               Reaction Scheme 1 where n is one or greater, depending upon the ratio of polyol to diisocyanate, for example, when the ratio is 2:1, n is 1. Similar reactions between polyols and dicarboxylic acids or dianhydrides can give HO—B—OH prepolymers with ester linking groups.

To prepare the non-silicone urethane-based reactive oligomers X-A-B-A-X, typically the HO—B—OH compounds are capped with an X—Z compound. The Z group of the X—Z compound is an isocyanate group and the X group is an ethylenically unsaturated group (i.e. a carbon-carbon double bond) and is linked to the Z group. The link between the X and Z groups may be a single bond or it may be a linking group. The linking group may be an alkylene group, a heteroalkylene group, an arylene group, a heteroarylene group, an aralkylene group, or a combination thereof.

Examples of X—Z compounds include a variety of different isocyanato (meth)acrylates such as isocyanatoethyl methacrylate, and m-isopropenyl-α,α-dimethyl benzyl isocyanate. An example of the synthesis of a X-A-B-A-X reactive oligomer is shown in Reaction Scheme 2 below:

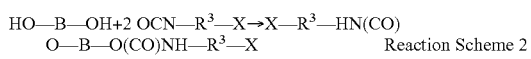
               Reaction Scheme 2

The B unit in the X-A-B-A-X reactive oligomer is a non-silicone group that may contain a variety of groups such as urea groups, amide groups, ether groups, carbonyl groups, ester groups, alkylene groups, heteroalkylene groups, arylene groups, heteroarylene groups, aralkylene groups, or combinations thereof. The B unit may also have a variety of molecular weights, depending upon the desired properties of the adhesive formed from the reactive oligomer. Generally, the B unit has a number average molecular weight of 5,000 grams/mole or greater. In some embodiments, the B unit is a heteroalkylene group.

A variety of X-A-B-A-X curable non-silicone urethane-based reactive oligomers are commercially available. For example, a urethane acrylate oligomer of weight average molecular weight in the range of 4,000-7,000 g/mole is commercially available from Nihon Gosei Kagaku under the trade name "UV-6100B". Also a variety of urethane oligomers are available from Sartomer Company, Exton, Pa. under the trade names "CN9018", "CN9002" and "CN9004".

Non-silicone urethane-based pressure sensitive adhesives may be prepared by polymerizing X-A-B-A-X reactive oligomers through the ethylenically unsaturated X groups to form polymers with adhesive properties. The polymers may contain only X-A-B-A-X reactive oligomers or they may be copolymers in which additional monomers or reactive oligomers are incorporated. As used herein, additional monomers or reactive oligomers are collectively referred to as ethylenically unsaturated materials.

Among the additional monomers useful for incorporation are monomers which contain ethylenically unsaturated groups and are therefore co-reactive with the reactive oligomers. Examples of such monomers include (meth)acrylates, (meth)acrylamides, alpha-olefins, and vinyl compounds such as vinyl acids, acrylonitriles, vinyl esters, vinyl ethers, styrenes and ethylenically unsaturated oligomers. In some instances more than one type of additional monomer may be used.

Examples of useful (meth)acrylates include alkyl (meth)acrylates, aromatic (meth)acrylates, and silicone acrylates. In applications in which it is desirable that the entire adhesive composition be silicone free, silicone acrylates are generally not used. Alkyl (meth)acrylate monomers are those in which the alkyl groups comprise 1 to about 20 carbon atoms (e.g., from 3 to 18 carbon atoms). Suitable acrylate monomers include, for example, methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates are useful as well. An example of an aromatic (meth)acrylate is benzyl acrylate.

Examples of useful (meth)acrylamides, include acrylamide, methacrylamide and substituted (meth)acrylamides such as N,N-dimethyl acrylamide, N,N-dimethyl methacrylamide, N,N-dimethylaminopropyl methacrylamide, N,N-diethylaminopropyl methacrylamide. N,N-dimethylaminoethyl acrylamide, N,N-dimethylaminoethyl methacrylamide, N,N-diethylaminoethyl acrylamide, and N,N-diethylaminoethyl methacrylamide.

The alpha-olefins useful as additional monomers generally include those with 6 or greater carbon atoms. The alpha-olefins with fewer than 6 carbon atoms tend to be too volatile for convenient handling under ambient reaction conditions. Suitable alpha-olefins include, for example, 1-hexene, 1-octene, 1-decene and the like.

Examples of useful vinyl compounds include: vinyl acids such as acrylic acid, itaconic acid, methacrylic acid; acrylonitriles such as acrylonitrile and methacrylonitrile; vinyl esters such as vinyl acetate and the vinyl esters of carboxylic acids such as neodecanoic, neononanoic, neopentanoic, 2-ethylhexanoic, or propionic acids; vinyl ethers such as alkyl vinyl ethers; and styrenes such as styrene or vinyl toluene. Other vinyl compounds that may be useful include N-vinylcaprolactam, vinylidene chloride, N-vinyl pyrrolidone, N-vinyl formamide, and maleic anhydride. For some uses, for example electronic applications, it may be desirable to include vinyl compounds that are free of acidic groups.

Examples of ethylenically unsaturated oligomers useful for copolymerization with the urethane-based reactive oligomers include, for example, ethylenically unsaturated silicone oligomers such as are describe in the PCT publication number WO 94/20583 and macromolecular monomers with relatively high glass transition temperatures as described in U.S. Pat. No. 4,554,324 (Husman et al.). In applications in which it is desirable that the entire adhesive composition be silicone free, silicone oligomers are generally not used.

The reaction mixture may also, if desired, contain one or more crosslinking agents. A crosslinking agent is used to build the molecular weight and the strength of the copolymer. Generally, the crosslinking agent is one that is copolymerized with the non-silicone containing urethane-based reactive oligomers and any optional monomers. The crosslinking agent may produce chemical crosslinks (e.g., covalent bonds or ionic bonds). Alternatively, it may produce thermally reversible physical crosslinks that result, for example, from the formation of reinforcing domains due to phase separation of hard segments (i.e., those having a Tg higher than room temperature, generally higher than 70° C.) such as the styrene macromers of U.S. Pat. No. 4,554,324 (Husman) and/or acid/base interactions (i.e., those involving functional groups within the same polymer or between polymers or between a polymer and an additive) such polymeric ionic crosslinking as described in WO 99/42536. Suitable crosslinking agents are also disclosed in U.S. Pat. Nos. 4,737,559 (Kellen), 5,506,279 (Babu et al.), and 6,083,856 (Joseph et al.). The crosslinking agent can be a photocrosslinking agent, which, upon exposure to ultraviolet radiation (e. g., radiation having a wavelength of about 250 nanometers to about 400 nanometers), causes the copolymer to crosslink.

Examples of suitable crosslinking agents include, for example, multifunctional ethylenically unsaturated monomers. Such monomers include, for example, divinyl aromatics, divinyl ethers, multifunctional maleimides, multifunctional acrylates and methacrylates, and the like, and mixtures thereof. Particularly useful are divinyl aromatics such as divinyl benzene and multifunctional (meth)acrylates. Multifunctional (meth)acrylates include tri(meth)acrylates and di(meth)acrylates (that is, compounds comprising three or two (meth)acrylate groups). Typically di(meth)acrylate crosslinkers (that is, compounds comprising two (meth)acrylate groups) are used. Useful tri(meth)acrylates include, for example, trimethylolpropane tri(meth)acrylate, propoxylated trimethylolpropane triacrylates, ethoxylated trimethylolpropane triacrylates, tris(2-hydroxy ethyl)isocyanurate triacrylate, and pentaerythritol triacrylate. Useful di(meth)acrylates include, for example, ethylene glycol di(meth)acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth)acrylate, alkoxylated 1,6-hexanediol diacrylates, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth)acrylates, and urethane di(meth)acrylates.

The crosslinking agent is used in an effective amount, by which is meant an amount that is sufficient to cause crosslinking of the pressure sensitive adhesive to provide adequate cohesive strength to produce the desired final adhesion properties to the substrate of interest. Generally, the crosslinking agent is used in an amount of about 0.1 part to about 10 parts, based on the total amount of monomers.

Generally the non-silicone urethane-based adhesives are pressure sensitive adhesives and have glass transition temperature (Tg) values of room temperature (approximately 20° C.) or below. In some embodiments the Tg of the non-silicone urethane-based adhesives are 0° C. or below, or even −10° C. or below.

The non-silicone urethane-based adhesives can be made by solvent processes, solventless processes (e.g., continuous solventless processes or polymerization on a surface or in a mold) or by a combination of these methods.

Some of the processes suitable for the preparation of the non-silicone urethane-based adhesives include the free radical polymerization of non-silicone urethane-based reactive oligomers with optional ethylenically unsaturated materials in a reactor to form the non-silicone urethane-based adhesive. The non-silicone urethane-based adhesive can then be removed from the reaction vessel. Alternatively, the polymerization can be carried out by continuously mixing the reactants and depositing the reactants on a surface (e.g., release liner or substrate) or into a mold and polymerizing the mixture in place.

In some embodiments, it has been found convenient to deposit a mixture of the non-silicone urethane-based reactive oligomer, additional monomers if desired, and initiator onto a surface, activate the initiator and cure the adhesive on the surface. The mixture may or may not contain a solvent. If solvent is used, the cured adhesive is typically dried to remove the solvent.

The initiator may be either a thermal initiator or a photoinitiator. Suitable thermal free radical initiators which may be utilized include, but are not limited to, those selected from azo compounds, such as 2,2'-azobis(isobutyronitrile); hydroperoxides, such as tert-butyl hydroperoxide; and, peroxides, such as benzoyl peroxide and cyclohexanone peroxide. Photoinitiators which are useful include, but are not limited to, those selected from benzoin ethers, such as benzoin methyl ether or benzoin isopropyl ether; substituted benzoin ethers, such as anisole methyl ether; substituted acetophenones, such as 2,2-diethoxyacetophenone and 2,2-dimethoxy-2-phenyl acetophenone; substituted alpha-ketols, such as 2-methyl-2-hydroxy propiophenone; aromatic sulfonyl chlorides, such as 2-naphthalene sulfonyl chloride; and, photoactive oximes, such as 1-phenyl-1,2-propanedione-2-(ethoxycarbonyl) oxime or benzophenone derivatives. Benzphenone derivatives and methods for making them are well known in the art, and are described in, for example, U.S. Pat. No. 6,207,727 (Beck et al.). Exemplary benzophenone derivatives include symmetrical benzophenones (e.g., benzophenone, 4,4'-dimethoxybenzophenone, 4,4'-diphenoxybenzophenone, 4,4'-diphenylbenzophenone, 4,4'-dimethylbenzophenone, 4,4-dichlorobenzophenone); asymmetric benzophenones (e.g., chlorobenzophenone, ethylbenzophenone, benzoylbenzophenone, bromobenzophenone); and free-radically polymerizable benzophenones (e.g., acryloxyethoxybenzophenone). Benzophenone itself is inexpensive, and may be preferable if cost is a factor. Copolymerizable benzophenones may be useful if residual odor or volatiles are a concern, and may be preferable for those applications as they become covalently incorporated into the composition during cure. Examples of useful copolymerizable photoinitiators are disclosed, for example, in U.S. Pat. No. 6,369,123 (Stark et al.), U.S. Pat. No. 5,407,971 (Everaerts et al.), and U.S. Pat. No. 4,737,559 (Kellen et al.). The copolymerizable photocrosslinking agents either generate free radicals directly or abstract hydrogen abstraction atoms to generate free radicals. Examples of hydrogen abstraction type photocrosslinkers include, for example, those based on benzophenones, acetophenones, anthraquinones, and the like. Examples of suitable copolymerizable hydrogen abstraction crosslinking compounds include mono-ethylenically unsaturated aromatic ketone monomers free of orthoaromatic hydroxyl groups. Examples of suitable free-radical generating copolymerizable crosslinking agents include but are not limited to those selected from the group consisting of 4-acryloxybenzophenone (ABP), para-acryloxyethoxybenophenone, and para-N-(methacryloxyethyl)-carbamoylethoxybenophenone. For both thermal-and radiation-induced polymerizations, the initiator is present in an amount of about 0.05% to about 5.0% by weight based upon the total weight of the monomers.

In addition to the reactants, optional property modifying additives can be mixed with the reactive oligomers and optional other monomers provided that they do not interfere with the polymerization reaction. Typical property modifiers include tackifying agents (tackifiers) and plasticizing agents (plasticizers) to modify the adhesive performance of the formed adhesive composition. If used, the tackifiers and plasticizers are generally present in amounts ranging from about 5% to about 55% by weight, about 10 to about 45% by weight or even from about 10% to about 35% by weight.

Useful tackifiers and plasticizers are those conventionally used in the adhesive arts. Examples of suitable tackifying resins include terpene phenolics, alpha methyl styrene resins, rosin derived tackifiers, monomeric alcohols, oligomeric alcohols, oligomeric glycols, and mixtures thereof. Examples of useful plasticizing resins include terpene phenolics, rosin derived plasticizers, polyglycols and mixtures thereof. In some embodiments the plasticizer is isopropyl myristate or a polypropylene glycol.

The formed polymer composition may also be blended with additional pressure sensitive adhesive polymers to modify the properties of the composition. In some embodiments an acidic pressure sensitive adhesive, such as an acidic (meth)acrylate pressure sensitive adhesive, is blended to form an acid-base interaction with the urethane groups on the non-silicone urethane-based adhesive copolymer. This acid-base interaction between the polymers is a Lewis acid-base type interaction. Lewis acid-base type interactions require that one component be an electron acceptor (acid) and the other an electron donor (base). The electron donor provides an unshared pair of electrons and the electron acceptor furnishes an orbital system that can accommodate the additional unshared pair of electrons. In this instance acid groups, typically carboxylic acid groups on the added (meth)acrylate pressure sensitive adhesive polymer interact with the unshared electron pairs of the urethane groups.

Examples of suitable (meth)acrylate pressure sensitive adhesives include (meth)acrylate copolymers prepared from alkyl (meth)acrylate monomers and may contain additional monomers such as vinyl monomers. Examples of such alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl, acrylate, and mixtures thereof Optionally, other vinyl monomers and alkyl (meth)acrylate monomers which, as homopolymers, have a Tg greater than 0° C., such as methyl acrylate, methyl methacrylate, isobornyl acrylate, vinyl acetate, styrene, and the like, may be utilized in conjunction with one or more of the low Tg alkyl (meth)acrylate monomers and copolymerizable acidic monomers, provided that the Tg of the resultant (meth)acrylate copolymer is less than about 0° C.

When the (meth)acrylate pressure sensitive adhesive is an acidic copolymer, the acidic (meth)acrylate copolymers typically are derived from acidic monomers comprising about 2% by weight to about 30% by weight, or about 2% by weight to about 15% by weight, of a copolymerizable acidic monomer. Examples of useful acidic monomers include (meth)acrylic acid, itaconic acid, crotonic acid, maleic acid, fumaric acid, and the like.

When used, the added pressure sensitive adhesive may be used in any suitable amount to achieve the desired properties of the composition. For example, the added pressure sensitive adhesive may be added in amounts of from about 5 to about 60 weight % of the composition.

In addition, other property modifiers, such as fillers, may be added if desired, provided that if and when incorporated, such additives are not detrimental to the properties desired in the final composition. Fillers, such as fumed silica, fibers (e.g., glass, metal, inorganic, or organic fibers), carbon black, glass or ceramic beads/bubbles, particles (e.g., metal, inorganic, or organic particles), polyaramids (e.g., those available from DuPont Chemical Company; Wilmington, Del. under the trade designation, KEVLAR), and the like which can be added in amounts up to about 30% by weight. Other additives such as dyes, inert fluids (e.g., hydrocarbon oils), pigments, flame retardants, stabilizers, antioxidants, compatibilizers, antimicrobial agents (e.g., zinc oxide), electrical conductors, thermal conductors (e.g., aluminum oxide, boron nitride, aluminum nitride, and nickel particles), and the like can be blended into these systems in amounts of generally from about 1 to about 50 percent by total volume of the composition.

The adhesives formed by the polymerization of the non-silicone urethane-based reactive oligomers may be pressure sensitive adhesives or heat activated adhesives. Generally pressure sensitive adhesives are formed. These pressure sensitive adhesives are useful in a wide array of applications.

The use of reactive oligomers instead of low molecular weight monomers to generate the pressure sensitive adhesive polymers results in polymers that are free of volatile unreacted materials and other low molecular weight impurities after polymerization. Residual monomers and low molecular weight impurities may be problematic in certain applications, such as medical and electronic applications. In medical and electronic applications, residual monomers and impurities may cause, for example, undesirable odor or potential contamination of substrates/articles (e.g., hard disk drives) in which they are in contact. In addition, the use of reactive oligomers which are free of silicone is desirable in certain industries, such as the electronics industry, where silicone contamination is a concern.

The adhesive, or the reactive mixture which upon polymerization forms the adhesive, may be coated onto a surface to form a wide variety of adhesive articles. For example, the adhesive can be applied to films or sheeting products (e.g., decorative, reflective, and graphical), labelstock, tape backings (e.g., polymeric films, metal films, paper, creped paper, foams, and the like), release liners, and the like. The substrate can be any suitable type of material depending on the desired application.

The adhesive can be formed into a film or coating by either continuous or batch processes. An example of a batch process is the placement of a portion of the adhesive between a substrate to which the film or coating is to be adhered and a surface capable of releasing the adhesive film or coating to form a composite structure. The composite structure can then be compressed at a sufficient temperature and pressure to form a adhesive coating or film of a desired thickness after cooling. Alternatively, the adhesive can be compressed between two release surfaces and cooled to form an adhesive transfer tape useful in laminating applications.

Continuous forming methods include drawing the adhesive out of a film die and subsequently contacting the drawn adhesive to a moving plastic web or other suitable substrate. A related continuous method involves extruding the adhesive and a coextruded backing material from a film die and cooling the layered product to form an adhesive tape. Other continuous forming methods involve directly contacting the adhesive to a rapidly moving plastic web or other suitable preformed substrate. Using this method, the adhesive is applied to the moving preformed web using a die having flexible die lips, such as a rotary rod die. After forming by any of these continuous methods, the adhesive films or layers can be solidified by quenching using both direct methods (e.g., chill rolls or water baths) and indirect methods (e.g., air or gas impingement).

Adhesives can also be coated using a solvent-based method. For example, the adhesive can be coated by such methods as knife coating, roll coating, gravure coating, rod coating, curtain coating, and air knife coating. The adhesive mixture may also be printed by known methods such as screen printing or inkjet printing. The coated solvent-based adhesive is then dried to remove the solvent. Typically, the coated solvent-based adhesive is subjected to elevated temperatures, such as those supplied by an oven, to expedite drying of the adhesive.

In some embodiments it may be desirable to impart a microstructured surface to one or both major surfaces of the adhesive. It may be desirable to have a microstructured surface on at least one surface of the adhesive to aid air egress during lamination. If it is desired to have a microstructured surface on one or both surfaces of the adhesive layer, the adhesive coating or layer may be placed on a tool or a liner containing microstructuring. Either the adhesive or the reactive mixture which upon polymerization forms the adhesive, may be placed on a tool or a liner. The liner or tool can then be removed to expose an adhesive layer having a microstructured surface. Upon lamination, the microstructuring on the surface of the adhesive may disappear over time as the adhesive wets the surface. This is particularly desirable where the adhesive is used in an optical construction where residual microstructuring could interfere with the optical properties of the optical construction.

The thickness of the adhesive layer tends to be at least about 1 micrometer, at least 5 micrometers, at least 10 micrometers, at least 15 micrometers, or at least 20 micrometers. The thickness is often no greater than about 200 micrometers, no greater than about 175 micrometers, no greater than about 150 micrometers, or no greater than about 125 micrometers. For example, the thickness can be 1 to 200 micrometers, 5 to 100 micrometers, 10 to 50 micrometers, 20 to 50 micrometers, or 1 to 15 micrometers.

The pressure sensitive adhesives are typically optically clear. Optically clear adhesives may be used to make a wide array of optical articles. Such articles may include an optical film, a substrate or both. Such uses include information displays, window coverings, graphic articles and the like.

Articles are provided that include an optical film and a pressure sensitive adhesive layer adjacent to at least one major surface of the optical film. The articles can further include another substrate (e.g., permanently or temporarily attached to the pressure sensitive adhesive layer), another adhesive layer, or a combination thereof. As used herein, the term "adjacent" can be used to refer to two layers that are in direct contact or that are separated by one or more layers. Often, adjacent layers are in direct contact.

In some embodiments, the resulting articles can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, screens or displays, cathode ray tubes, polarizers, reflectors, and the like.

Any suitable optical film can be used in the articles. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, infrared reflective films, ultraviolet reflective films, reflective polarizer films such as a brightness enhancement films and dual brightness enhancement films, absorptive polarizer films, optically clear films, tinted films, privacy films such as light-collimating films, and antireflective films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle.

Some optical films have multiple layers such as multiple layers of polymer-containing materials (e.g., polymers with or without dyes) or multiple layers of metal-containing material and polymeric materials. Some optical films have alternating layers of polymeric material with different indexes of refraction. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

The substrate included in the article can contain polymeric materials, glass materials, ceramic materials, metal-containing materials (e.g., metals or metal oxides), or a combination thereof. The substrate can include multiple layers of material such as a support layer, a primer layer, a hard coat layer, a decorative design, and the like. The substrate can be permanently or temporarily attached to an adhesive layer. For example, a release liner can be temporarily attached and then removed for attachment of the adhesive layer to another substrate.

The substrate can have a variety of functions such as, for example, providing flexibility, rigidity, strength or support, reflectivity, antireflectivity, polarization, or transmissivity (e.g., selective with respect to different wavelengths). That is, the substrate can be flexible or rigid; reflective or non-reflective; visibly clear, colored but transmissive, or opaque (e.g., not transmissive); and polarizing or non-polarizing.

Exemplary substrates include, but are not limited to, the outer surface of an electronic display such as liquid crystal display or a cathode ray tube, the outer surface of a window or glazing, the outer surface of an optical component such as a reflector, polarizer, diffraction grating, mirror, or lens, another film such as a decorative film or another optical film, or the like.

Representative examples of polymeric substrates include those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like.

In other embodiments, the substrate is a release liner. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The liner can have a microstructure on its surface that is imparted to the adhesive to form a microstructure on the surface of the adhesive layer. The liner can then be removed to expose an adhesive layer having a microstructured surface.

The release liner can be removed to adhere the optical film to another substrate (i.e., removal of the release liner exposes a surface of an adhesive layer that subsequently can be bonded to another substrate surface).

The adhesives are self wetting and removable. The adhesives exhibit great conformability permitting them to spontaneously wet out substrates. The surface characteristics also permit the adhesives to be bonded and removed from the substrate repeatedly for repositioning or reworking The strong cohesive strength of the adhesives gives them structural integrity limiting cold flow and giving elevated temperature resistance in addition to permanent removability. In some embodiments the initial removability of an adhesive coated article bonded to a glass substrate, as measured by the 90° Peel Adhesion test described in the Examples section below, is no greater than 2.9 Newtons/decimeter (75 grams per inch). Upon aging for one week at room temperature the removability, as measured by the 90° Peel Adhesion test described in the Examples section below, is no more than 7.7 Newtons/decimeter (200 grams per inch). In other embodiments, the removability after aging for at least one week at room temperature, as measured by the 90° Peel Adhesion test described in the Examples section below, is no more than 15.4 Newtons/decimeter (400 grams per inch), 7.7 Newtons/decimeter (200 grams per inch) or even 3.9 Newtons/decimeter (100 grams per inch).

Exemplary adhesive articles in which the self wetting and removability features are especially important include, for example: large format articles such as graphic articles and protective films; and information display devices.

Large-format graphic articles or protective films typically include a thin polymeric film backed by a pressure sensitive adhesive. These articles may be difficult to handle and apply onto a surface of a substrate. The large format article may be applied onto the surface of a substrate by what is sometimes called a "wet" application process. The wet application process involves spraying a liquid, typically a water/surfactant solution, onto the adhesive side of the large format article, and optionally onto the substrate surface. The liquid temporarily "detackifies" the pressure sensitive adhesive so the installer may handle, slide, and re-position the large format article into a desired position on the substrate surface. The liquid also allows the installer to pull the large format article apart if it sticks to itself or prematurely adheres to the surface of the substrate. Applying a liquid to the adhesive may also improve the appearance of the installed large format article by providing a smooth, bubble free appearance with good adhesion build on the surface of the substrate.

Examples of a large format protective films include window films such as solar control films, shatter protection films, decoration films and the like. In some instances the film may be a multilayer film such as a multilayer IR film (i.e., an infrared reflecting film), such as a microlayer film having selective transmissivity such as an optically clear but infrared reflecting film as described in U.S. Pat. No. 5,360,659 (Arends et al.).

While the wet application process has been used successfully in many instances, it is a time consuming and messy process. A "dry" application process is generally desirable for installing large format graphic articles. Adhesives that are self wetting and removable may be applied with a dry installation process. The articles are easily attached to a large substrate because they are self wetting and yet they may be easily removed and repositioned as needed.

In other applications, such as information display devices, the wet application process cannot be used. Examples of information display devices include devices with a wide range of display area configurations including liquid crystal displays, plasma displays, front and rear projection displays, cathode ray tubes and signage. Such display area configurations can be employed in a variety of portable and non-portable information display devices including personal digital assistants, cell phones, touch-sensitive screens, wrist watches, car navigation systems, global positioning systems, depth finders, calculators, electronic books, CD or DVD players, projection television screens, computer monitors, notebook computer displays, instrument gauges, instrument panel covers, signage such as graphic displays (including indoor and outdoor graphics, bumper stickers, etc) reflective sheeting and the like.

A wide variety of information display devices are in use, both illuminated devices and non-illuminated devices. Many of these devices utilize adhesive articles, such as adhesive coated films, as part of their construction. One adhesive article frequently used in information display devices is a protective film. Such films are frequently used on information display devices that are frequently handled or have exposed viewing surfaces.

In some embodiments, the adhesives of this disclosure may be used to attach such films to information display devices because the adhesives have the properties of optical clarity, self wetting and removability. The adhesive property of optical clarity permits the information to be viewed through the adhesive without interference. The features of self wetting and removability permit the film to be easily applied to display surface, removed and reworked if needed during assembly and also removed and replaced during the working life of the information display device.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| VDM | Vinyl dimethyl azlactone |
| Polyamine-1 | Polyoxyalkylene polyamine of approximately 2,000 molecular weight, commercially available as "JEFFAMINE D-2000" from Huntsman, Houston, TX. |

-continued

Table of Abbreviations

| Abbreviation or Trade Designation | Description |
|---|---|
| Photoinitiator-1 | Photoinitiator "DAROCUR 4265" commercially available from Ciba, Hawthorne, NY. |
| PET | UV-primed polyester film of polyethylene terephthalate available under the trade name "Dupont 617" having a thickness of 127 micrometers (5 mils) or 51 micrometers (2 mils) from Dupont Teijin Films, Richmond, VA. |
| Release Liner | Polyester film of 51 micrometer thickness (2 mils) coated on one side with silicone release agent, commercially available from CP Film, Martinsville, VA as "T10 Release Liner". |
| UBDA 8K | Urea-based diamine of approximately 8,000 molecular weight, prepared as described in Synthesis Example 1. |
| UBDA 12K | Urea-based diamine of approximately 12,000 molecular weight, prepared as described in Synthesis Example 2. |
| UA-1 | Urethane acrylate, aliphatic urethane oligomer commercially available from Sartomer Company Inc., Exton PA as "CN9018", with a published Tg = −56° C. |
| UA-2 | Urethane acrylate, commercially available from Sartomer Company Inc., Exton PA as "CN9004", with a published Tg = −76° C. |
| UA-3 | Urethane acrylate, commercially available from Sartomer Company Inc., Exton PA as "CN9002", with a published Tg = −50.0° C. |
| PSA-1 | Pressure sensitive adhesive solution, 20% solids by weight in ethyl acetate, of a copolymer PSA with an approximate ratio of monomers of 93/7 isoctyl acrylate/acrylic acid prepared as described in U.S. patent RE 24,906 (Ulrich). |
| UA-4 | Urethane acrylate, commercially available from Sartomer Company Inc., Exton PA as "CN972", with a published Tg = −47° C. |
| UA-5 | Urethane acrylate, commercially available from Sartomer Company Inc., Exton PA as "CN990", with a published Tg = −37° C. |
| UA-6 | Urethane acrylate, commercially available from Sartomer Company Inc., Exton PA as "CN991", with a published Tg = +27° C. |
| UA-7 | Urethane acrylate, commercially available from Sartomer Company Inc., Exton PA as "CN929", with a published Tg = +43° C. |
| TRPGDA | Tripropylene glycol diacrylate |

Test Methods
90° Peel Adhesion

Adhesive coatings of 51 micrometers (2 mils) thickness on 51 micrometer (2 mil) thick PET film were cut into 2.54 centimeter by 15 centimeter strips. Each strip was then adhered to a 6.2 centimeter by 23 centimeter clean, solvent washed glass coupon using a 2-kilogram roller passed once over the strip. The bonded assembly dwelled at room temperature for about one minute and was tested for 90° peel adhesion using an IMASS slip/peel tester with a 90° peel testing assembly (Model SP2000, commercially available from Instrumentors Inc., Strongsville, Ohio) at a rate of 2.3 meters/minute (90 inches/minute) over a five second data collection time. Three samples were tested; the reported peel adhesion value is an average of the peel adhesion value from each of the three samples. Data was measured in grams/inch width and converted to Newtons per decimeter (N/dm).

Wet Out Test

Adhesive coatings of 51 micrometers (2 mils) thickness on 127 micrometer (5 mil) thick PET film were cut into sample squares of 12.7 by 12.7 centimeters (5 by 5 inches). A 7.6 by 7.6 centimeter (3 by 3 inch) square was marked in the center of the backside of each sample square. The liner was removed from the sample square and one corner of the sample square was placed on the surface of an isopropanol-washed glass coupon. The sample square was dropped onto the glass surface. The wet out time was measured using a stopwatch and was started when the wet out front reached any part of the inner marked square and ended when the inner square was completely wet out. The wet out time was recorded, and is reported as the time (in seconds) per area wet out (in square centimeters).

Titration Method To Determine Molecular Weight

To determine the molecular weight of a synthesized UBDA, a measured sample weight (about 4-6 grams) was placed in a jar and tetrahydrofuran (about 3 times the weight of the sample) was added with mixing to form a uniform solution. A solution of the indicator bromophenol blue was added until the color was a deep blue. With constant stirring, the sample solution was titrated by adding 1.0 Normal HCl (aq) dropwise until a color change from blue to yellow indicated that the endpoint was reached. The endpoint volume of HCl titrated was recorded and the molecular weight was calculated.

SYNTHESIS EXAMPLES

Synthesis Example 1

Preparation of UBDA 8K

A sample of Polyamine-1 (4 moles) was degassed under vacuum at 100° C. for 1 hour. Freshly ground diphenyl carbonate (3 moles) was added and the mixture stirred to give a uniform mixture. The mixture was heated to 160° C. for 3 hours under vacuum to remove phenol byproduct. The resultant product was a urea chain extended diamine of approximately 8,000 molecular weight (confirmed by titration, using the method described above).

Synthesis Example 2

Preparation of UBDA 12K

A sample of Polyamine-1 (6 moles) was reacted with a sample of diphenyl carbonate (5 moles) using the procedure described in Synthesis Example 1 above. The resultant product was a urea chain extended diamine of approximately 12,000 molecular weight (confirmed by titration, using the method described above).

Comparative Example C1

To a stirred sample of UBDA 8K (1 mole) was added slowly a sample of VDM (2 moles) at room temperature. The mixture was stirred and allowed to react overnight. A sample of Photoinitiator-1 was added (0.5% by weight). The resultant mixture was cast between PET and a Release Liner on a knife die and marble bed hand spread coater to a thickness appropriate for the test to be run on the sample and cured under low intensity UV exposure using 40 watt, 350 nanometer bulbs for 10 minutes. Wet out testing to glass, 90° Peel adhesion to glass (initial and after aging for 1 week at 70° C.) were carried out using the test methods described above. The results are presented in Table 1.

Comparative Example C2

To a stirred sample of UBDA 12K (1 mole) was added slowly a sample of VDM (2 moles) at room temperature. The mixture was stirred and allowed to react overnight. A sample of Photoinitiator-1 was added (0.5% by weight). The resultant mixture was cast between PET and a Release Liner on a knife die and marble bed hand spread coater to a thickness appropriate for the test to be run on the sample and cured under low intensity UV exposure using 40 watt, 350 nanometer bulbs for 10 minutes. Wet out testing to glass, 90° Peel adhesion to glass (initial and after aging for 1 week at 70° C.) were carried out using the test methods described above. The results are presented in Table 1.

Example 1

To a stirred sample of UA-1, Photoinitiator-1 was added (1.0% by weight) and the resultant mixture was cast between PET and a Release Liner on a knife die and marble bed hand spread coater to a thickness appropriate for the test to be run on the sample and cured under high intensity UV exposure using Fusion 600 Watt/in, D bulbs at 25 feet per minute (7.5 meters per minute) line speed. Wet out testing to glass, 90° Peel adhesion to glass (initial and after aging for 1 week at 70° C.) were carried out using the test methods described above. The results are presented in Table 1.

Example 2

To a stirred sample of UA-2, Photoinitiator-1 was added (1.0% by weight) and the resultant mixture was cast between PET and a Release Liner on a knife die and marble bed hand spread coater to a thickness appropriate for the test to be run on the sample and cured under high intensity UV exposure using Fusion 600 Watt/in, D bulbs at 25 feet per minute (7.5 meters per minute) line speed. Wet out testing to glass, 90° Peel adhesion to glass (initial and after aging for 1 week at 70° C.) were carried out using the test methods described above. The results are presented in Table 1.

Example 3

To a stirred sample of UA-3, Photoinitiator-1 was added (1.0% by weight) and the resultant mixture was cast between PET and a Release Liner on a knife die and marble bed hand spread coater to a thickness appropriate for the test to be run on the sample and cured under high intensity UV exposure using Fusion 600 Watt/in, D bulbs at 25 feet per minute (7.5 meters per minute) line speed. Wet out testing to glass, 90° Peel adhesion to glass (initial and after aging for 1 week at 70° C.) were carried out using the test methods described above. The results are presented in Table 1.

Example 4

To a stirred sample of UA-1, IPM was added to 20% by weight, Photoinitiator-1 was added (1.0% by weight) and the resultant mixture was cast between PET and a Release Liner on a knife die and marble bed hand spread coater to a thickness appropriate for the test to be run on the sample and cured under high intensity UV exposure using Fusion 600 Watt/in, D bulbs at 25 feet per minute (7.5 meters per minute) line speed. Wet out testing to glass, 90° Peel adhesion to glass (initial and after aging for 1 week at 70° C.) were carried out using the test methods described above. The results are presented in Table 1.

Example 5

To a stirred sample of UA-1 (dissolved to in Ethyl Acetate to 80% solids), IPM was added to 25% by weight of total solids, TRPGDA was added to 15% by weight total solids, PSA-1 solution was added to 10% by weight of total solids, Photoinitiator-1 was added (1.0% by weight of total solids) and the resultant mixture was cast onto PET and dried for 10 minutes at 70° C. to remove solvent. A release liner was laminated onto the uncured coating and the sample was cured under high intensity UV exposure using Fusion 600 Watt/in, D bulbs at 25 feet per minute (7.5 meters per minute) line speed. Wet out testing to glass, 90° Peel adhesion to glass (initial and after aging for 1 week at 70° C.) were carried out using the test methods described above. The results are presented in Table 1.

Comparative Example C3

To a stirred sample of UA-4, Photoinitiator-1 was added (1.0% by weight) and the resultant mixture was cast between PET and a Release Liner on a knife die and marble bed hand spread coater to a thickness appropriate for the test to be run on the sample and cured under high intensity UV exposure using Fusion 600 Watt/in, D bulbs at 25 feet per minute (7.5 meters per minute) line speed. Wet out testing to glass, 90° Peel adhesion to glass (initial and after aging for 1 week at 70° C.) were carried out using the test methods described above. The results are presented in Table 1.

Comparative Example C4

To a stirred sample of UA-5, Photoinitiator-1 was added (1.0% by weight) and the resultant mixture was cast between PET and a Release Liner on a knife die and marble bed hand spread coater to a thickness appropriate for the test to be run on the sample and cured under high intensity UV exposure using Fusion 600 Watt/in, D bulbs at 25 feet per minute (7.5 meters per minute) line speed. Wet out testing to glass, 90° Peel adhesion to glass (initial and after aging for 1 week at 70° C.) were carried out using the test methods described above. The results are presented in Table 1.

Comparative Example C5

To a stirred sample of UA-6, Photoinitiator-1 was added (1.0% by weight) and the resultant mixture was cast between PET and a Release Liner on a knife die and marble bed hand spread coater to a thickness appropriate for the test to be run on the sample and cured under high intensity UV exposure using Fusion 600 Watt/in, D bulbs at 25 feet per minute (7.5 meters per minute) line speed. Wet out testing to glass, 90° Peel adhesion to glass (initial and after aging for 1 week at 70° C.) were carried out using the test methods described above. The results are presented in Table 1.

Comparative Example C6

To a stirred sample of UA-7, Photoinitiator-1 was added (1.0% by weight) and the resultant mixture was cast between PET and a Release Liner on a knife die and marble bed hand spread coater to a thickness appropriate for the test to be run on the sample and cured under high intensity UV exposure using Fusion 600 Watt/in, D bulbs at 25 feet per minute (7.5 meters per minute) line speed. Wet out testing to glass, 90° Peel adhesion to glass (initial and after aging for 1 week at 70° C.) were carried out using the test methods described above. The results are presented in Table 1.

TABLE 1

| Example | Initial 90° Peel from Glass (N/dm) | 90° Peel from Glass after aging 1-week 70° C. (N/dm) | Wet-out to glass Speed (sec/cm$^2$) |
|---------|---|---|---|
| C1 | 3.12 | 6.04 | 0.55 |
| C2 | 5.17 | 12.74 | 1.39 |
| 1 | 13.90 | 34.20 | 0.31 |
| 2 | 0.73 | 1.16 | 0.10 |
| 3 | 1.38 | 2.12 | 0.16 |
| 4 | 4.13 | 10.22 | 0.17 |
| 5 | 2.23 | 5.40 | 0.14 |
| C3 | 0.58 | 1.30 | 0.43 |
| C4 | <0.38 | — | 0.78 |
| C5 | <0.38 | — | NW |
| C6 | <0.38 | — | NW |

NW = No wet out observed without the application of external pressure.

What is claimed is:

1. An adhesive comprising a cured mixture comprising:
   at least one X-A-B-A-X reactive oligomer, wherein
   X comprises an ethylenically unsaturated group,
   B comprises a non-silicone unit with a number average molecular
   weight of 5,000 grams/mole or greater comprising an oxyalkylene group, and
   A comprises a urethane linking group, wherein the adhesive is optically clear, self-wetting and removable.

2. The adhesive of claim 1 wherein the adhesive has a Tg of less than 20° C.

3. The adhesive of claim 1 wherein the adhesive has a Tg of less than −10° C.

4. The adhesive of claim 1 wherein the adhesive has a microstructured surface.

5. The adhesive of claim 1 wherein the cured mixture further comprises an ethylenically unsaturated material.

6. The adhesive of claim 1 further comprising an additive, wherein the additive comprises another pressure sensitive adhesive polymer, a plasticizing agent, a tackifying agent or mixture thereof.

7. The adhesive of claim 6, comprising 5-60 weight % added pressure sensitive adhesive polymer and 5-55 weight % plasticizer.

* * * * *